United States Patent
Hlipala et al.

[15] 3,699,369
[45] Oct. 17, 1972

[54] TEMPERATURE COMPENSATED ADJUSTABLE DAMPER UNIT

[72] Inventors: Edward Hlipala, Wayne; Arnold Schindel, Fair Lawn, both of N.J.

[73] Assignee: The Singer Company

[22] Filed: June 21, 1971

[21] Appl. No.: 155,069

[52] U.S. Cl. .................................310/106, 244/83 D
[51] Int. Cl. ...................................................H02k 49/04
[58] Field of Search...........310/93, 105, 77, 78, 106; 188/165; 244/83 D, 83

[56] References Cited

UNITED STATES PATENTS

| | | |
|---|---|---|
| 2,964,661 | 12/1960 | Sutherland et al...........310/93 |
| 2,770,743 | 11/1956 | Wallach..................310/93 X |
| 3,042,820 | 7/1962 | Diamond.....................310/93 |
| 2,720,603 | 10/1955 | Mitchel et al................310/97 |
| 2,605,875 | 8/1952 | Stephenson...............310/93 X |
| 2,772,841 | 12/1956 | Bonsteel..................244/83 D |

Primary Examiner—D. F. Duggan
Attorney—S. A. Giarratana et al.

[57] ABSTRACT

An adjustable damper unit is provided which exerts a restraining torque on a shaft, the torque being directly proportional to the angular velocity of the shaft. Damping is provided by a magnetic restraint on a drag cup driven through the magnetic field of a permanent magnet by planetary gears. An external adjusting ring controls the magnitude of the magnetic restraint and thereby controls the damping rate.

3 Claims, 3 Drawing Figures

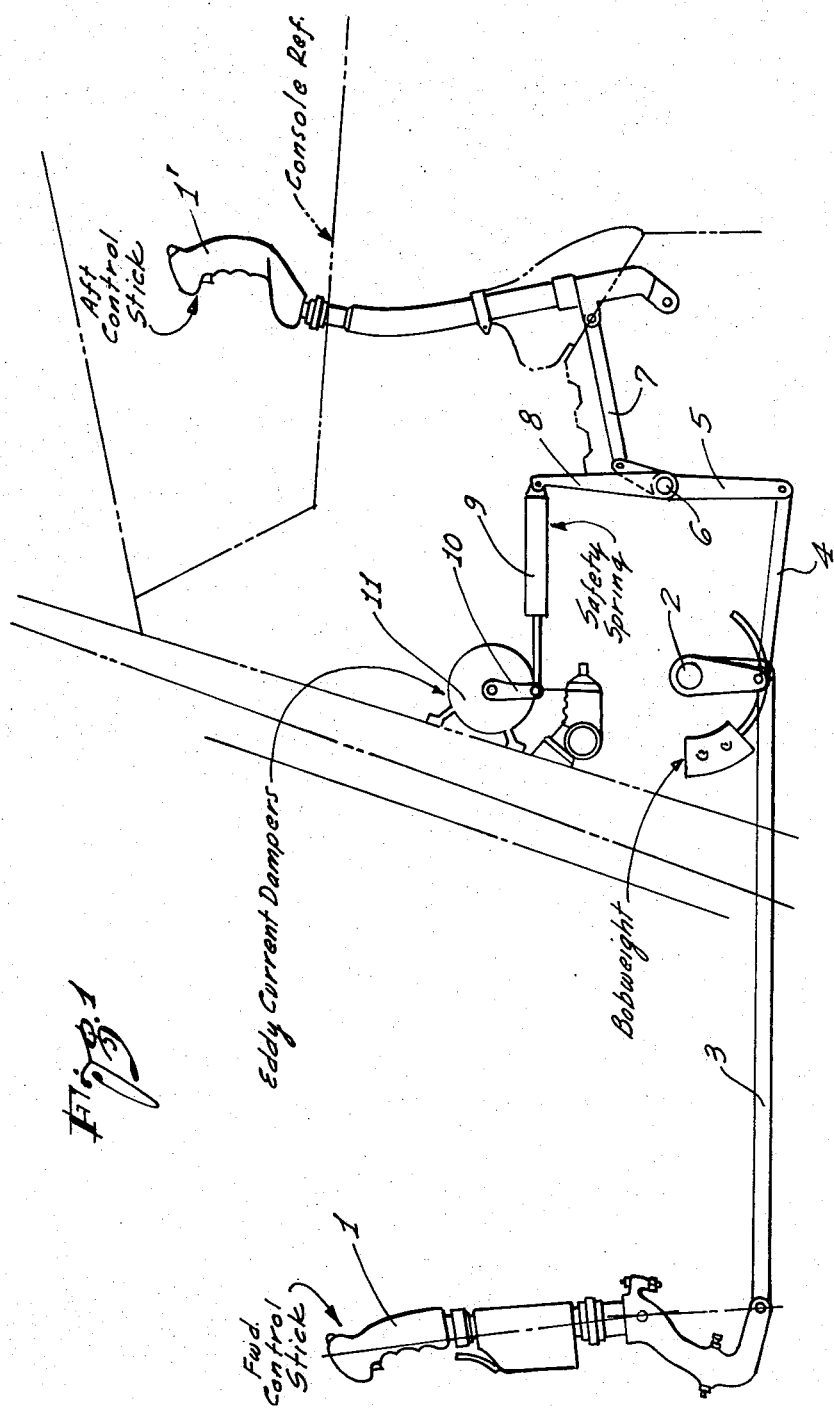

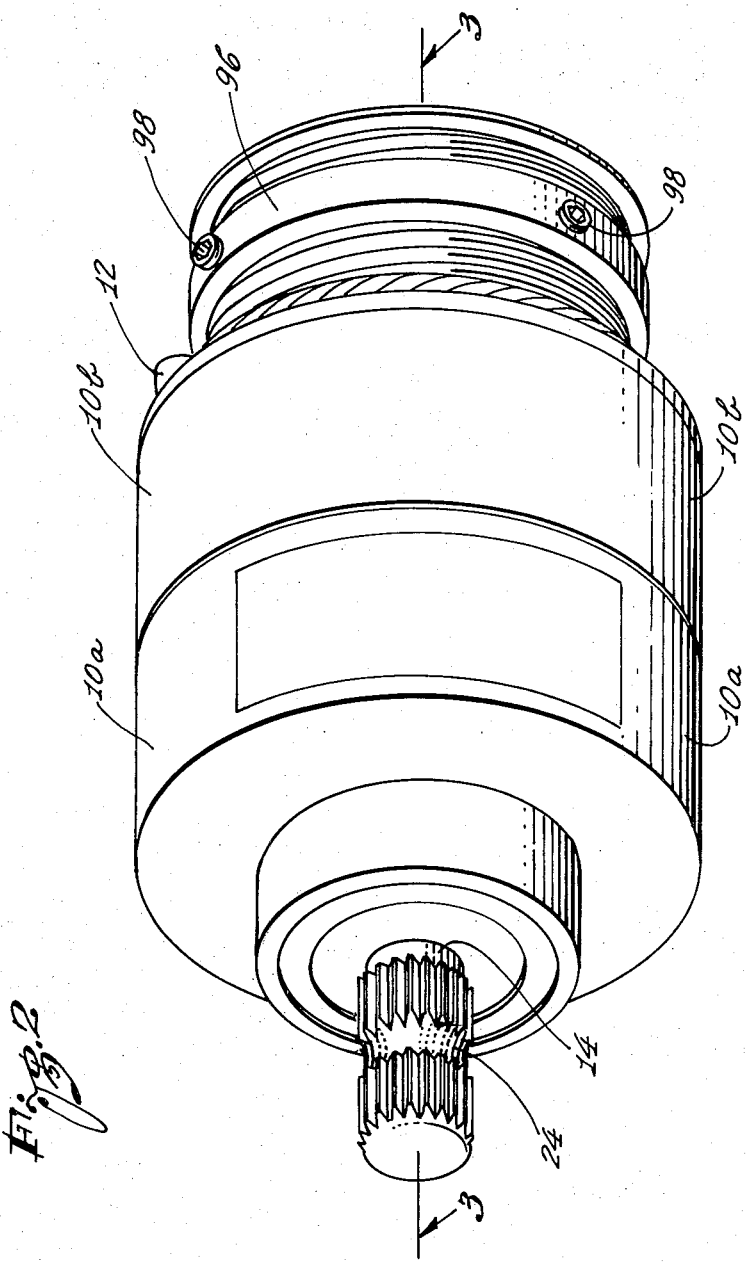

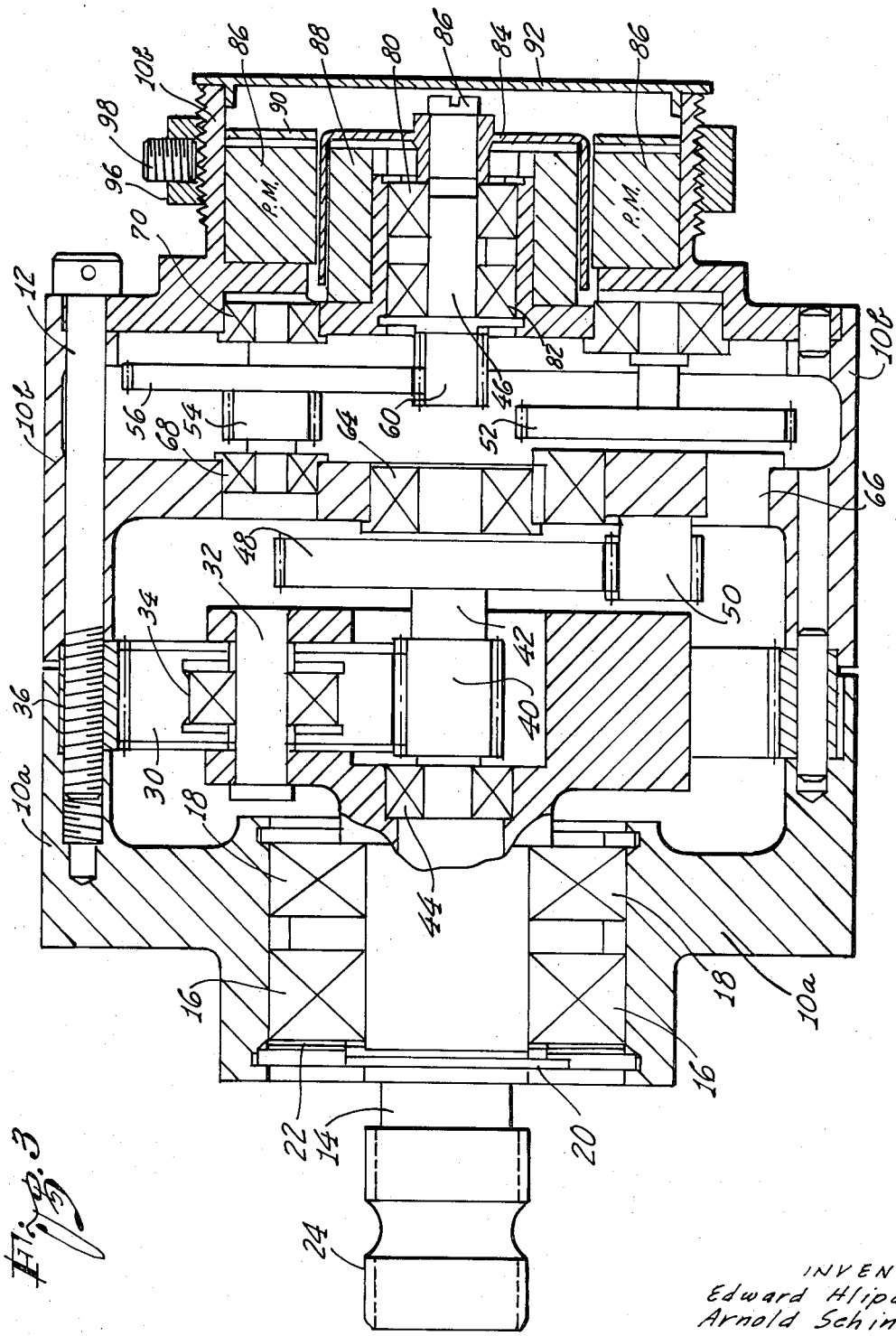

TEMPERATURE COMPENSATED ADJUSTABLE DAMPER UNIT

BACKGROUND OF THE INVENTION

Damping units are known to the art, and these for the most part are hydraulic in nature. However, the hydraulic damper units suffer from a variation of torque gradient as a function of ambient temperature. Eddy current damper units are also known to the art, these being predicated on the principle of developing a torque in response to the flow of electrical eddy currents in an electrical conductor as the conductor is moved through a magnetic field. However, the prior art eddy current damper units are difficult to adjust, to a desired degree of damping.

Damper units are used, for example, by airframe manufacturers, flight control manufacturers, flight control system manufacturers, and others. Such units are usually used, for example, to provide feel and/or washout control in electrically assisted flight systems, or to add realism to simulated controls.

The eddy current damper unit to be described is advantageous as compared with the usual prior art hydraulic damper units, in that there is no forward leakage. Also, the eddy current damper of the invention exhibits low backlash characteristics, and it also has quick, rapid and convenient damping adjustment capabilities.

The unit to be described operates, for example, in a temperature range of from −54° C to +125° C without exhibiting any temperature effect on the damping torque. The unit also is advantageous in that it is relatively inexpensive. Moreover, it is compact in size and self-contained, and it requires no maintenance.

Specifically, the damper unit of the present invention is compensated to minimize the effect of temperature on its damping characteristics. In addition, and as will be described, the unit of the invention is easily adjustable by convenient external means. The unit to be described maintains relatively low inertia at the input member. Moreover, it provides high gradients of damping in a relatively small volume.

BRIEF DESCRIPTION OF THE DRAWINGS

FIG. 1 shows an eddy current damper device which may be constructed in accordance with the invention, and which is installed in an aircraft control stick system;

FIG. 2 is an elevational view of a damper unit constructed to incorporate the concepts of the invention; and FIG. 3 is a side section of the unit of FIG. 1, taken essentially along the line 2—2 of FIG. 1.

DETAILED DESCRIPTION OF THE ILLUSTRATED EMBODIMENT

The system of FIG. 1 is an aircraft control system, and constitutes typical installation of the damper unit of the invention. For example, the aircraft control system includes a forward control stick 1 in a rear control stick 1'. The forward control stick 1, for example, actuates a control shaft 1' through a usual linkage 3. The linkage 3 is also coupled through a linkage 4 and crank 5 to a further shaft 6. The rear control stick 1' is also coupled to the shaft 6 through a link 7. The shaft 6, in turn, is coupled through a link 8 and safety spring 9 to a crank arm 10 which, in turn, is coupled to the input shaft of a damper 11. The damper 11 may be constructed to incorporate the teaching of the invention, as will be described. The purpose of the damper 11 is to provide a desired "feel" to the control system of FIG. 1, so that when either the forward control stick or the rear control stick are operated, a reaction force is sensed by the operator, and this force increases the speed with which the sticks are moved is increased. Details of the damper 11 are shown, for example, in FIGS. 2 and 3.

The unit illustrated in FIGS. 2 and 3 includes a cylindrical shaped two-piece housing designated 10a and 10b which is formed of appropriate non-magnetic material. The housing section 10a and 10b are held together by appropriate bolts, such as a bolt 12. An input shaft 14 is rotatably mounted in the housing section 10a and is supported therein, for example, by means of a pair of bearings 16 and 18, the bearings being held in the housing by retaining rings 20 and 22. An appropriate coupling 24 is mounted on the input shaft 14, and shims 22 are provided for minimum axial movement.

The shaft 14 supports a plurality of planetary gears 30 which are mounted on respective heads 32 by corresponding bearings 34. The planetary gears engage an internal running gear 36 formed on the inner surface of the housing sections 10a and 10b, and the planetary gears 30 also engage a pinion gear 40 which is mounted on a shaft 42 supported in a bearing 44. In this way, rotation of the input shaft 14 by the coupling 24 causes the planetary gears 30 to rotate the shaft 42. The shaft 42 is coupled to a further shaft 46 through a spur gear train including, for example, gears 48 and 50, 52, 54, 56 and 60.

The gear 48 is mounted on the shaft 42, which is supported on its right-hand by a bearing 64. The gears 50 and 52 are interconnected and are supported in a bearing 66. The gears 54 and 56 are interconnected and are supported in bearings 68 and 70. The gear 60 is mounted on the end of the shaft 46, the shaft being supported in bearings 80 and 82. The spur gear train provides a step-up ratio between the pinion gear 40 and the shaft 46. The resulting gear transmission system provides a low friction coupling between the input shaft 14 and the shaft 46, and it enables the shaft 46 to rotate at a relatively high speed upon the rotation of the shaft 14.

A cup 84 of electrically conductive material, such as aluminum or copper, is mounted on the right-hand end of the shaft 46, and is supported on the shaft, for example, by means of a screw 86. The cup 84 extends between an annular permanent magnet member 86 and a concentric annular member 88, the latter member being composed of magnetizable material, and constituting a return path for a plurality of radially disposed magnetic poles exhibited by the annular permanent magnetic member 86.

As the electrically conductive cup 84 is rotated in the annular space between the annular members 86 and 88, eddy currents are developed in the cup which set up a restraining torque. This torque is reflected to the input shaft 14 in the ratio of N2/N1, where N2 is the angular velocity of the shaft 46, and N1 is the angular velocity of the input shaft 14.

One or more ferromagnetic rings, such as ring 90, are positioned adjacent the end of the permanent annular magnet 86, as shown. The rings 90 are held adjacent the bore of the housing, and may be moved back and forth along the bore, to adjust the position thereof with respect to the annular permanent magnet 86. The rings are accessible through a cover 92 which is fitted across the front of the housing section 10b.

The ferromagnetic rings serve to shunt off some of the magnetic flux from the air gap between the permanent magnet 86 and the annular magnetic member 88. Then, as the temperature increases, the permeability of the magnetic path provided by the ferromagnetic rings 90 decreases at a rapid rate resulting in an increased magnetic flux in the air gap. This increased flux compensates for the loss in eddy current torque resulting from an increased cup resistivity towards the higher ambient temperatures. The rings 90 may be adjusted so that the eddy current torque exhibited by the device is essentially constant through a wide range of ambient temperatures.

A further ferromagnetic ring 96 is mounted on the end of the housing section 10b for convenient external adjustment. As the ring 96 is turned relative to the housing section 10b, its axial position with respect to the permanent magnet 86 is shifted, to shunt flux from the air gap. This results in a reduction in torque, so that a convenient control of the damping exerted by the unit is provided. A radial screw 98 permits the ring 96 to be locked at any desired position, after the adjustment has been made.

The invention provides, therefore, an improved temperature compensated adjustable eddy current damper unit which is constructed to provide a restraining torque at an input shaft which is directly proportional to the velocity in which the input shaft is directly proportional to the velocity in which the input shaft is rotated. As described, the damper unit of the invention uses the principle of eddy currents flowing in the electrically conductive drag cup, as the cup is rotated in the electrical field of a permanent magnet. The described embodiment of the invention is compensated to minimize the effects of temperature on damping, and incorporates an external ring which is easily adjustable to provide any desired degree of damping effect. The unit of the invention is advantageous in that it is compact, and it is relatively inexpensive. The unit maintains relatively low inertia at the input shaft, and it provides high gradients of damping in small volume.

It will be appreciated that although a particular embodiment of the invention has been shown and described, modifications may be made. It is intended in the following claims to cover all modifications which come within the spirit and scope of the invention.

What is claimed is:

1. An eddy current damper unit comprising:
a housing;
an input shaft rotatably mounted in the housing;
a further shaft rotatably mounted in the housing, a gear transmission system coupling said input shaft to said further shaft and providing a step-up transmission ratio between said input shaft and said further shaft;
magnetic field producing means mounted coaxially with said further shaft;
magnetizable means mounted concentrically within said magnetic field producing means and defining an annular air gap therewith;
an electrically conductive cup member mounted on said further shaft coaxially therewith and extending into said air gap for rotation with said further shaft, said cup member having eddy currents generated therein upon rotation of said further shaft which develop a restraining torque, said restraining torque being reflected through said gear transmission system to said input shaft;
ferromagnetic shunt means mounted adjacent said magnetic field producing means for shunting a portion of the magnetic flux in said air gap, the permeability of said shunt means decreasing for increases in ambient temperature to compensate for the loss in eddy current torque resulting from increased electrical resistance of said cup member at said higher temperatures, and
a ferromagnetic ring member surrounding said magnetic field producing means for shunting flux from the air gap, so as to control the restraining torque reflected to the input shaft, said annular ferromagnetic member being adjustable axially with respect to said magnetic field producing means.

2. The eddy current damper unit defined in claim 1, in which said magnetic field producing means comprises an annular permanent magnetic member which develops radially extending magnetic poles around the axis of rotation of said further shaft; and said magnetizable means comprises an annular magnetic member disposed coaxially within said annular permanent magnet member and surrounding said further shaft.

3. In combination:
aircraft control system including at least one pivotally mounted control stick;
a shaft;
a linkage mechanism coupling the control stick to the shaft to produce rotation of the shaft upon pivotable movement of the control stick;
an eddy current damper device having input shaft, said damper device providing a restraining torque to said input shaft which is directly proportional to the velocity at which the input shaft is rotated; and
linkage means coupled to said input shaft and to said control stick, so that a restraining force is reflected to said control stick which is proportional to the velocity in which the control stick is actuated about its pivot point.

* * * * *